Dec. 25, 1962  A. HASBROUCK  3,070,329
DIRECTIONAL CONTROL FOR ROCKETS
Filed Feb. 16, 1960
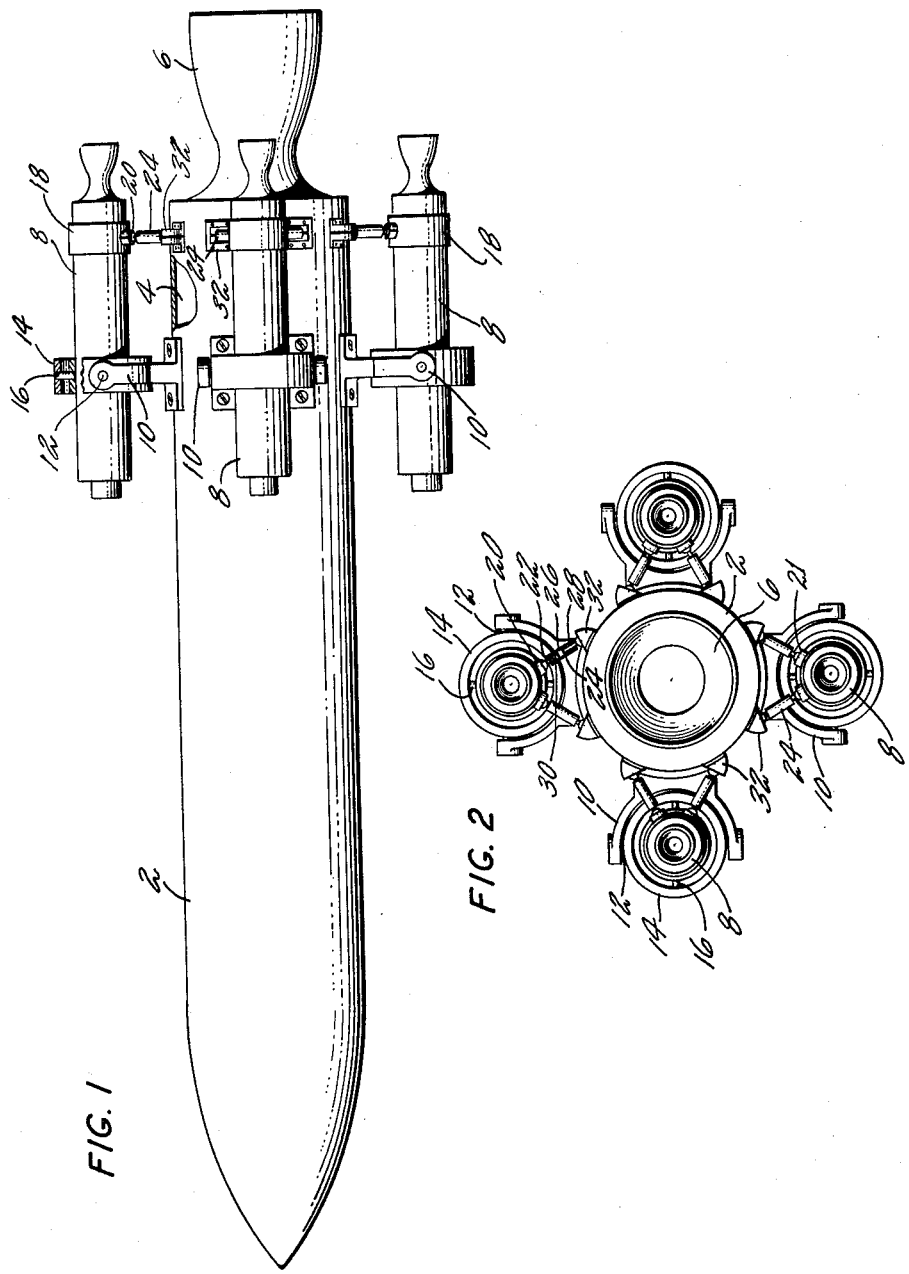
INVENTOR
AUGUSTUS HASBROUCK
BY Charles A. Warren
ATTORNEY

United States Patent Office 3,070,329
Patented Dec. 25, 1962

3,070,329
DIRECTIONAL CONTROL FOR ROCKETS
Augustus Hasbrouck, Middletown, Conn., assignor to United Aircraft Corporation, East Hartford, Conn., a corporation of Delaware
Filed Feb. 16, 1960, Ser. No. 8,967
8 Claims. (Cl. 244—52)

This invention relates to missiles or other space vehicles the direction of which can be controlled in flight.

On feature of this invention is the use of a plurality of independently movable steering rockets by which to impart to the main rocket or vehicle a steering thrust at an acute angle to the line of thrust of the main propulsive nozzle.

Another feature is the arrangement of the steering rockets externally of the vehicle in such a way that the resulting steering thrust may be at any angle desired with the steering rockets normally extending axially and supplementing the thrust of the main nozzle.

Another feature is the use of these steering rockets to provide for roll control.

Other features and advantages will be apparent from the specification and claims, and from the accompanying drawing which illustrates an embodiment of the invention.

FIG. 1 is a view in elevation of a space vehicle embodying the invention.

FIG. 2 is an end view of the vehicle of FIG. 1 as seen from the nozzle end.

The invention is shown as applied to a vehicle 2 which incorporates therein and preferably in its downstream end a combustion chamber 4 in which propellants are burned to form propulsive gas for discharge through the main propulsive nozzle 6 positioned on the downstream end of the vehicle. The type of propulsive rocket is not of importance with respect to the present invention. It is sufficient that the main propulsive nozzle 6 provides the main propulsive thrust for the vehicle along a line coincident with the longitudinal axis of the vehicle.

For steering the vehicle or for controlling roll of the vehicle, a plurality of smaller steering rockets 8 are arranged around the vehicle at the downstream end. In the arrangement shown there are four steering rockets, FIG. 2, arranged at angles to 90° to one another. Two of the steering rockets may provide pitch control and the other two may provide yaw control. Also, either pair or all of the rockets may be used to provide for roll control of the rocket. Each auxiliary rocket is supported by a yoke 10 on the vehicle, the yoke being preferably located adjacent to the longitudinal midpoint of the auxiliary rocket. The yoke carries pivot pins 12 which support a gimbal ring 14 for turning about an axis at right angles to a longitudinal plane through the auxiliary and main rockets. The ring 14 is connected to the auxiliary rocket by pins 16 at right angles to the pins 12, the pins 16 thus being radial to the main rocket axis. This gimballing of the auxiliary rocket permits its movement about the axis of the pins 12 (movement in a longitudinal plane through the axis of the main rocket) or permits its movement aobut the axis of the pins 16 (movement in a plane at right angles to the longitudinal plane).

Adjacent to the downstream end of each steering or auxiliary rocket is mounted a supporting ring 18 having projecting lugs 20 each of which receives the ball end 21 on the projecting stem 22 on an actuating cylinder 24. Each cylinder has a cooperating piston 26 with a projecting piston rod 28 connected at its outer end by a ball and socket connection 30 to a lug 32 on the vehicle.

The lugs 32 are spaced apart on the vehicle a greater distance than the spacing of lugs 20 so that by admitting fluid selectively to one cylinder of the pair of cylinders for any one rocket the latter will be moved in a generally tangential direction for the purpose of roll control.

By admitting fluid under pressure to the radially inner end of the pair of cylinders 24 that support any one of the steering rockets 8 the associated steering rocket may be pivoted about its support pins 12 so that the line of thrust of the rocket is at an acute angle to the axis of the vehicle thereby imparting a change in direction to the vehicle. It will be understood that any suitable control mechanism may be used for supplying fluid under pressure selectively to the appropriate cylinders.

Suitable valving not shown may provide for connecting both cylinders of any one of the auxiliary rockets simultaneously to a source of fluid under pressure in order to move the discharge end of that rocket radially outward for yaw or pitch control. Alternatively, directing fluid under pressure to one cylinder only of one pair of the rockets, the nozzles of that pair of rockets will be moved approximately tangentially to increase or reduce the rate of roll of the rocket. To minimize the fluid required the cylinders may incorporate springs 30 acting on the pistons. These springs will return the steering nozzles to the non-steering position shown whenever fluid is vented from the appropriate cylinders.

It is to be understood that the invention is not limited to the specific embodiment herein illustrated and described, but may be used in other ways without departure from its spirit as defined by the following claims.

I claim:

1. A space vehicle including a main rocket nozzle mounted on and having its line of thrust coincident with the longitudinal axis of the vehicle and a plurality of smaller steering rockets surrounding said main nozzle and mounted externally of the vehicle, each steering rocket being mounted for individual pivotal movement on an axis at right angles to an axial plane through the main rocket and the respective steering rocket and means for individually moving each steering rocket in its respective axial plane about its pivotal axis, said means including actuating elements extending between the steering rocket and the main rocket externally of the rockets and at points axially spaced from the pivotal mounting for the steering rocket.

2. A vehicle as in claim 1 in which there are at least four steering rockets uniformly spaced about the axis of the vehicle.

3. A vehicle as in claim 1 in which the steering rockets are normally parallel to the main nozzle to add to the thrust of the main nozzle.

4. A vehicle as in claim 1 in which the steering rockets are also mounted for pivotal movement on axes radially of the main vehicle.

5. A vehicle as in claim 1 in which the pivotal support is adjacent to the longitudinal center of each steering rocket and the moving means for each rocket are adjacent the downstream end of the steering rocket.

6. A vehicle including therein a rocket combustion chamber, a thrust nozzle at the end of the vehicle through which the flow of combustion gases is discharged, said thrust nozzle having its line of thrust axially of the vehicle, and a plurality of steering rockets mounted externally on said vehicle, each of said steering rockets being mounted for pivotal movement in an axial plane through the longitudinal axis of the vehicle and through the respective steering rocket and further being mounted for movement in said axial plane, and means to so move said steering rockets including a pair of actuating cylinders for each rocket being attached to the steering rocket at closely spaced points and to the vehicle at more widely spaced points.

7. A vehicle as in claim 6 in which the moving means for each of the steering rockets is independently operable such that each steering rocket is independently movable from the normal position parallel to the longitudinal axis of the vehicle.

8. A vehicle as in claim 5 in which the moving means for each rocket is a pair of actuating cylinders attached to the steering rocket at closely spaced points and to the main rocket at more widely spaced points in a circumferential direction.

References Cited in the file of this patent

UNITED STATES PATENTS

| | | |
|---|---|---|
| 2,552,359 | Winslow | May 8, 1951 |
| 2,748,703 | Goss et al. | June 5, 1956 |
| 2,787,218 | Anthony | Apr. 2, 1957 |
| 2,995,319 | Kershner et al. | Aug. 8, 1961 |

FOREIGN PATENTS

| | | |
|---|---|---|
| 160,981 | Australia | Feb. 8, 1955 |

OTHER REFERENCES

Aviation Week magazine, New York, March 10, 1958, vol. 68, No. 10, pages 22, 23.